United States Patent
Lee

(12) 
(10) Patent No.: US 6,381,411 B1
(45) Date of Patent: Apr. 30, 2002

(54) CAMERA STRUCTURE

(76) Inventor: James Lee, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/684,128

(22) Filed: Oct. 6, 2000

(51) Int. Cl.[7] ............................... G03B 17/02
(52) U.S. Cl. ...................... 396/6; 396/538; 396/539
(58) Field of Search ..................... 396/6, 535, 538, 396/539

(56) References Cited

U.S. PATENT DOCUMENTS

| | | | | |
|---|---|---|---|---|
| 2,989,906 A | * | 6/1961 | Rentschler | ............ 396/539 |
| 3,096,699 A | * | 7/1963 | Harvey et al. | ............ 396/539 |
| 6,085,037 A | * | 7/2000 | Zawodny et al. | ............ 396/387 |
| 6,282,382 B1 | * | 8/2001 | Sakamoto et al. | ............ 396/535 |

* cited by examiner

*Primary Examiner*—Alan A. Mathews

(57) ABSTRACT

A camera structure includes a front cover coupled with a rear cover, a film winding spool mounted between the front cover and the rear cover and having a hollow compartment defined therein, a battery mounted in the hollow compartment of the film winding spool, an electrode piece secured on a bottom of the front cover and rested on a bottom of the battery, and a spring secured on a top of the rear cover and rested on a top of the battery. In such a manner, the battery is mounted in the hollow compartment of the film winding spool, thereby reducing the volume of the camera structure.

3 Claims, 3 Drawing Sheets

CAMERA STRUCTURE

BACKGROUND OF THE INVENTION

1. Field of the Invention

The present invention relates to a camera structure, and more particularly to a camera structure having a compact construction.

2. Description of the Related Art

A conventional camera in accordance with the prior art has to be provided with a battery compartment for receiving a battery therein so as to supply electric power to the flash of the camera, thereby increasing the volume of the camera. In addition, the conventional camera comprises an integrally formed frame, and a film winding spool mounted in the frame. However, the film winding spool is rotatable in the frame so that the incident light easily penetrates into the inside of the camera from the outer cover of the camera through the hollow of the film winding spool, thereby causing a light leak problem so that the film is easily exposed to the incident light.

SUMMARY OF THE INVENTION

The present invention has arisen to mitigate and/or obviate the disadvantage of the conventional camera.

In accordance with one aspect of the present invention, there is provided a camera structure comprising:

a front cover;

a rear cover coupled with the front cover;

a film winding spool mounted between the front cover and the rear cover and having a hollow compartment defined therein;

a battery mounted in the hollow compartment of the film winding spool;

an electrode piece secured on a bottom of the front cover and rested on a bottom of the battery; and a spring secured on a top of the rear cover and rested on a top of the battery;

wherein, the battery is mounted in the hollow compartment of the film winding spool, thereby reducing the volume of the camera structure.

The film winding spool has a top and a bottom each provided with an annular flange protruding outward therefrom. The camera structure further comprises a support frame secured between the front cover and the rear cover and mounted on the film winding spool for securing the film winding spool therein. The support frame has a top and a bottom each defining an annular groove for receiving the annular flange therein, thereby preventing a film of the camera structure from being exposed to the light. The support frame 6 includes a front frame and a rear frame coupled with each other.

The primary objective of the present invention is to provide a camera structure, wherein the battery is mounted in the hollow compartment of the film winding spool, thereby achieving the effect of reducing the volume of the camera structure.

Another objective of the present invention is to provide a camera structure, wherein the annular flanges of the film winding spool can be used to prevent the incident light from entering the support frame, thereby preventing the film of the camera structure from being exposed to the light.

A further objective of the present invention is to provide a camera structure, wherein the support frame is designed to have a separate form and includes a front frame and a rear frame detachably coupled with each other.

Further benefits and advantages of the present invention will become apparent after a careful reading of the detailed description with appropriate reference to the accompanying drawings.

DETAILED DESCRIPTION OF THE INVENTION

Figure 1:
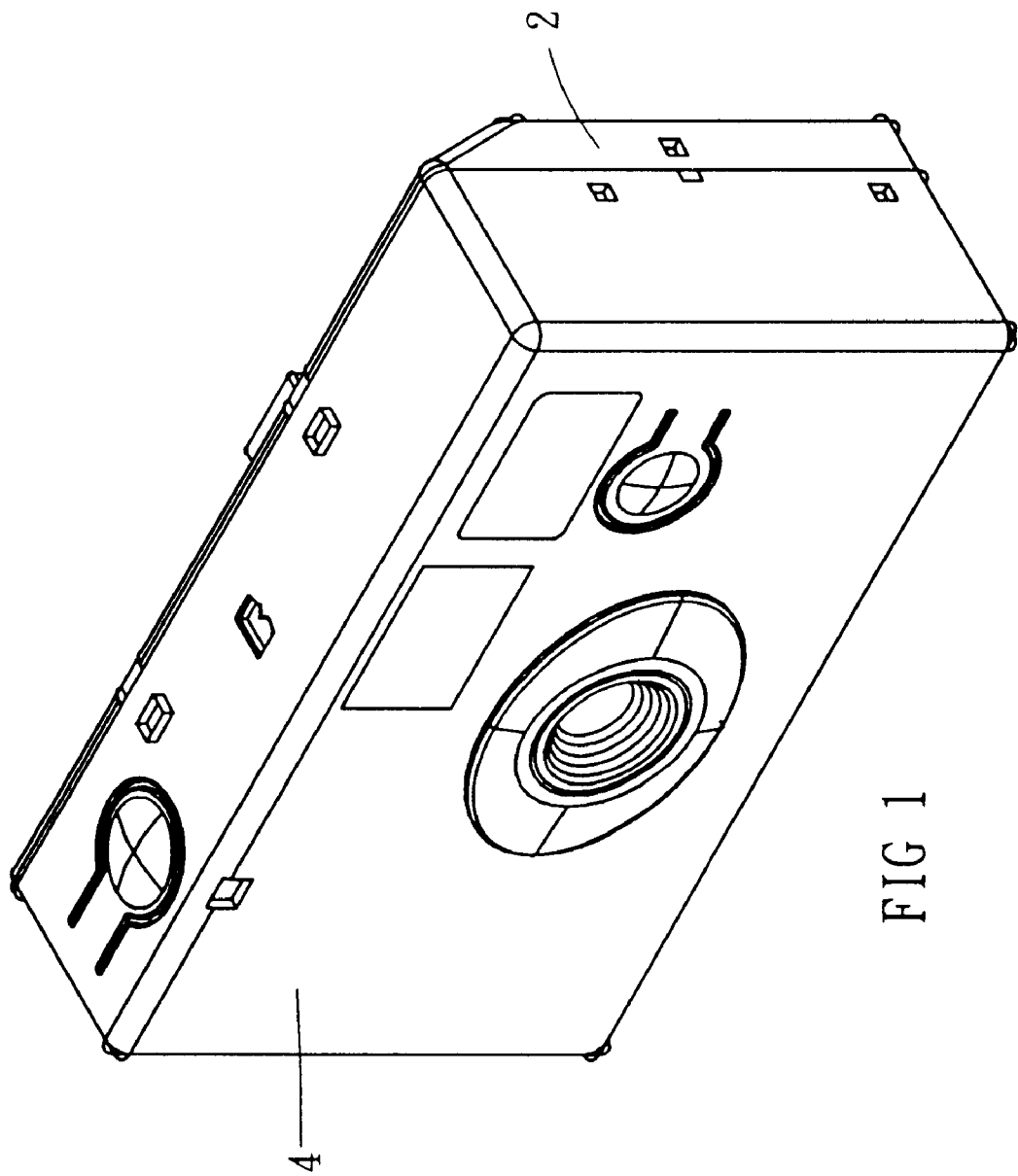
FIG. 1 is a perspective view of a camera structure in accordance with the present invention.
Figure 2:
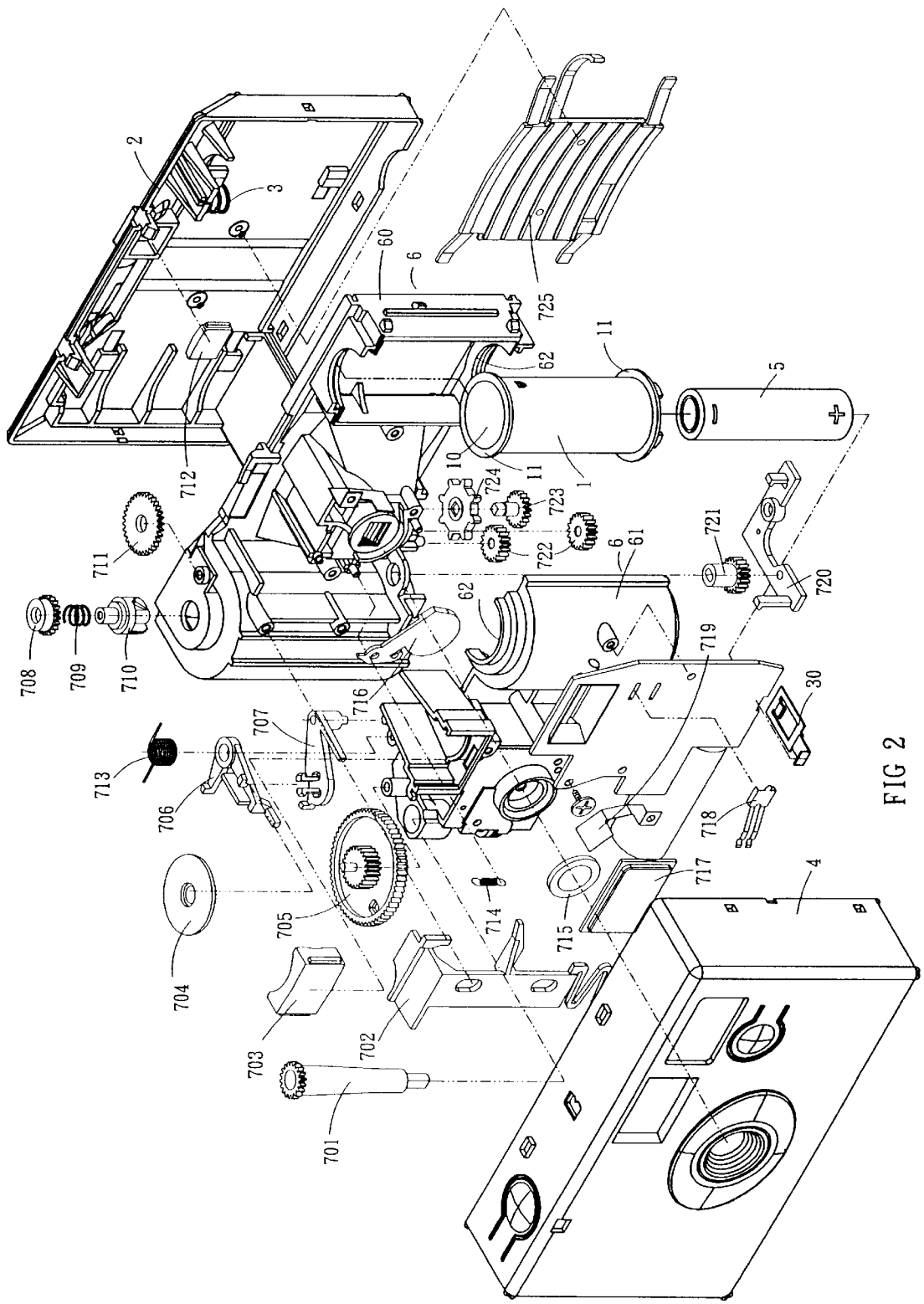
FIG. 2 is an exploded view of the camera structure as shown in FIG. 1.
Figure 3:
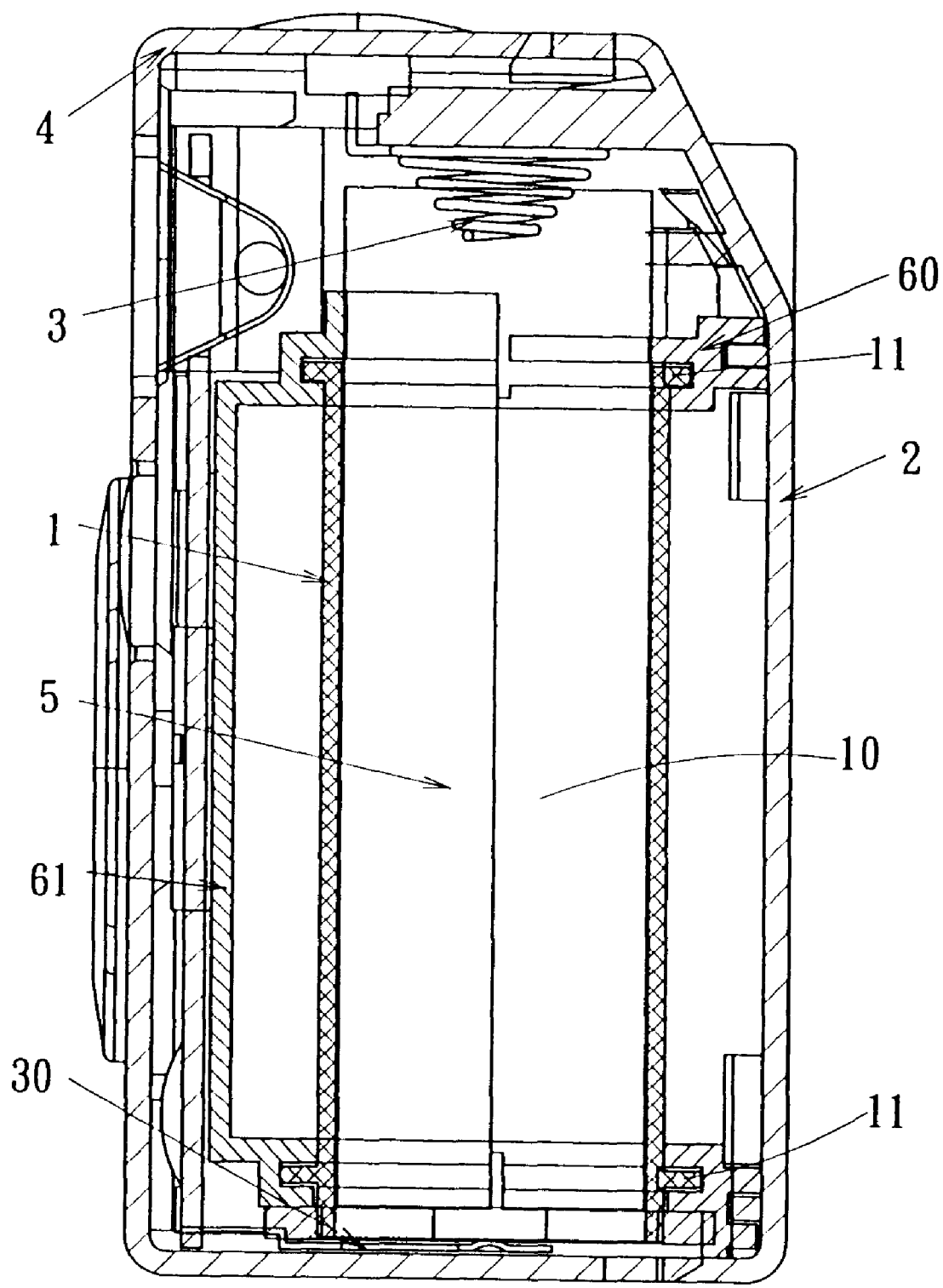
FIG. 3 is a side plan cross-sectional view of the camera structure as shown in FIG. 1.

Referring to FIGS. 1–3, a camera structure in accordance with the present invention is a camera of 35 mm type, for example, and includes a flash contained therein.

The camera structure comprises a front cover 4, a rear cover 2 coupled with the front cover 4, a film winding spool 1 mounted between the front cover 4 and the rear cover 2 and having a hollow compartment 10 defined therein, a battery 5 mounted in the hollow compartment 10 of the film winding spool 1, an electrode piece 30 secured on the bottom of the front cover 4 and rested on the bottom of the battery 5, and a spring 3 secured on the top of the rear cover 2 and rested on the top of the battery 5.

In assembly, the battery 5 is mounted in the hollow compartment 10 of the film winding spool 1, and is retained by the spring 3 and the electrode piece 30 so that the battery 5 is not rotated with the film winding spool 1. In such a manner, the battery 5 is mounted in the hollow compartment 10 of the film winding spool 1, thereby reducing the volume of the camera structure.

The film winding spool 1 has a top and a bottom each provided with an annular flange 11 protruding outward therefrom. The camera structure further comprises a support frame 6 secured between the front cover 4 and the rear cover 2 and mounted on the film winding spool 1 for securing the film winding spool 1 therein. Preferably, the support frame 6 is designed to have a separate form and includes a front frame 61 and a rear frame 60 coupled with each other.

The support frame 6 has a top and a bottom each defining an annular groove 62 for receiving the annular flange 11 therein. In such a manner, the annular flanges 11 of the film winding spool 1 can be used to efficiently prevent the ambient incident light from entering the support frame 6, thereby preventing the film of the camera structure from being exposed to the light.

The camera structure also comprises a gear linking lever 701, a shutter release shank 702, an object lens 703, a disk 704, a manually operated 20 wheel 705, a shutter drive lever 706, a disk support member 707, a film fork gear 708, a friction spring 709, a film box fork 710, a film linking gear 711, an eyepiece lens 712, a shutter drive lever torsion spring 713, a shutter piece pull spring 714, a main lens 715, a shutter piece 716, a flash window 717, a charge elastic piece 718, an exciting elastic piece 719, a gear press plate 720, a linking gear 721, two idler gears 722, a sprocket gear 723, a sprocket 724, and a film press plate 725.

It should be clear to those skilled in the art that further embodiments may be made without departing from the scope of the present invention.

What is claimed is:

1. A camera structure comprising:
   a front cover (4);
   a rear cover (2) coupled with said front cover (4);
   a film winding spool (1) mounted between said front cover (4) and said rear cover (2) and having a hollow compartment (10) defined therein;
   a battery (5) mounted in said hollow compartment (10) of said film winding spool (1);
   an electrode piece (30) secured on a bottom of said front cover (4) and rested on a bottom of said battery (5); and
   a spring (3) secured on a top of said rear cover (2) and rested on a top of said battery (5);
   wherein, said battery (5) is mounted in said hollow compartment (10) of said film winding spool (1), thereby reducing the volume of said camera structure.

2. The camera structure in accordance with claim 1, wherein said film winding spool (1) has a top and a bottom each provided with an annular flange (11) protruding outward therefrom, and said camera structure further comprises a support frame (6) secured between said front cover (4) and said rear cover (2) and mounted on said film winding spool (1) for securing said film winding spool (1) therein, said support frame (6) having a top and a bottom each defining an annular groove (62) for receiving said annular flange (11) therein, thereby preventing a film of said camera structure from being exposed to the light.

3. The camera structure in accordance with claim 2, wherein said support frame (6) includes a front frame (61) and a rear frame (60) coupled with each other.

* * * * *